United States Patent
Awater et al.

(10) Patent No.: US 6,968,013 B2
(45) Date of Patent: Nov. 22, 2005

(54) DECODING TECHNIQUES FOR MULTI-ANTENNA SYSTEMS

(75) Inventors: Greet Arnout Awater, Utrecht (NL); D.J. Richard Van Nee, De Meern (NL)

(73) Assignee: Agere Systems Inc., Allentown, PA (US)

( * ) Notice: Subject to any disclaimer, the term of this patent is extended or adjusted under 35 U.S.C. 154(b) by 621 days.

(21) Appl. No.: 09/848,882

(22) Filed: May 4, 2001

(65) Prior Publication Data

US 2002/0122501 A1 Sep. 5, 2002

(30) Foreign Application Priority Data

May 5, 2000 (EP) ............................................. 00303784

(51) Int. Cl.$^7$ .............................. H04L 5/12; H04L 7/04
(52) U.S. Cl. ...................................... 375/262; 375/268
(58) Field of Search .............................. 375/262, 340, 375/347, 343; 370/310, 341, 347, 348; 455/561

(56) References Cited

U.S. PATENT DOCUMENTS

| | | | | | |
|---|---|---|---|---|---|
| 5,592,490 | A | * | 1/1997 | Barratt et al. | 370/310 |
| 5,790,606 | A | * | 8/1998 | Dent | 375/348 |
| 5,844,951 | A | * | 12/1998 | Proakis et al. | 375/347 |
| 6,058,105 | A | * | 5/2000 | Hochwald et al. | 370/310 |
| 6,088,408 | A | * | 7/2000 | Calderbank et al. | 375/347 |
| 6,285,720 | B1 | * | 9/2001 | Martone | 375/262 |
| 6,526,090 | B1 | * | 2/2003 | Papasakellariou | 375/136 |
| 2002/0072392 | A1 | * | 6/2002 | Awater et al. | 455/561 |

FOREIGN PATENT DOCUMENTS

| | | | |
|---|---|---|---|
| EP | 0443997 | 8/1991 | ............. H04L/1/00 |
| WO | WO96/04738 | 2/1996 | ............. H04L/25/03 |
| WO | WO96/26578 | 8/1996 | ............. H04B/7/08 |
| WO | WO97/24849 | 7/1997 | ............. H04L/25/03 |

OTHER PUBLICATIONS

P. Jung, "A Unified Approach to Multiuser Detectors for CDMA and Their Geometrical Interpretations," *IEEE Journal on Selected Areas in Communications*, vol. 14, No. 8, pp. 1595–1601 (Oct. 1996).

* cited by examiner

*Primary Examiner*—Amanda T. Le
*Assistant Examiner*—Lawrence B. Williams

(57) ABSTRACT

A wireless radiofrequency data communication system has a base-station with N first groups and a signal processing-unit with a memory and processor. Each first group has a receiver-unit provided with a receiver and at least one antenna which is connected to the receiver-unit, and the signal processing-unit is connected with each of the first groups for processing receive-signals generated by each of the first groups. The base station further has M second groups for transmitting radiofrequency signals to the first groups. Each second group has a transmitter-unit provided with a transmitter and at least one antenna which is connected to the transmitter-unit. The memory of the signal processing-unit is provided with information about the transfer-functions of radiofrequency signals from each of the antennas of the second groups to each of the antennas of the first groups, and the transmitters and receivers operate on essentially the same radio frequency or radiofrequency-band.

20 Claims, 5 Drawing Sheets

DECODING TECHNIQUES FOR MULTI-ANTENNA SYSTEMS

BACKGROUND OF THE INVENTION

The invention relates to a wireless radiofrequency data communication system comprising: a base-station comprising N first groups and a signal processing-unit comprising memory means and processing means, wherein each first group comprises a receiver-unit provided with a receiver and at least one antenna which is connected to the receiver-unit, wherein the signal processing-unit is connected with each of the first groups for processing receive-signals generated by each of the first groups, and M second groups for transmitting radiofrequency signals to the first groups, wherein each second group comprises a transmitter-unit provided with a transmitter and at least one antenna which is connected to the transmitter-unit, wherein the memory means of the signal processing-unit are provided with information about the transfer-functions of radiofrequency signals from each of the antennas of the second groups to each of the antennas of the first groups, and wherein the transmitters and receivers operate on essentially the same radiofrequency or radiofrequency-band.

Wireless radiofrequency data communication systems of this type are known and find their applications in a variety of fields. An example of such an application can be found in the domain of digital communication for electronic-mail. In this application, each personal computer can be provided with at least one second set so that the personal computer can be incorporated in an network. The base-station may in that case be connected with a server of the network. Further examples are given, for instance, in the domain of mobile telephony. In the case of mobile telephony, the base-station is a telephony exchange. In the majority of the applications, more than one second set wants to communicate with the base-station. This means that the second group transmits signals to this base-station and also receives signals from this base-station. Since it would not be acceptable if all second groups would have to wait for each other's communication to be finished, there is a need for simultaneous communication. Simultaneous communication allows more second groups to communicate at the same time with the base-station. A straightforward and common way of realising simultaneous communication is to assign different radiofrequencies to the respective second groups. In this way, all data signals can be separated easily by the first groups in the base-station by frequency-selective filters. Furthermore, the base-station can communicate with each second group at the specific radiofrequency that has been assigned to the second group. A transmitted radiofrequency signal contains the actual information to be transmitted to the receiver. This actual information has been modulated on the radiofrequency carrier-signal. Several techniques have been developed for modulating information on the carrier-signal like frequency-modulation, phase-modulation, amplitude-modulation, et cetera.

A radiofrequency signal that is transmitted by a second group travels from the antenna of the second group along so-called travel-paths to the antennas of the first groups. During the travelling, depending of the specific travel-path, the radiofrequency signal is attenuated and also a phase-distortion is incurred on the radiofrequency signal. The phase-distortion of the radiofrequency signal can be corrected by the signal processing-unit in the base-station on the basis of the information about the transfer-functions. This can be of special interest if information is modulated on the radio-frequency signal according to a phase-modulation technique.

SUMMARY OF THE INVENTION

In an embodiment of the invention, a detection system increases the communication capacity of the wireless communication system per frequency or frequency-band used by the system. The embodiment increases the data communication capacity from the second groups to the first groups by creating multiple separate simultaneous data communication channels. This embodiment provides a detection system comprising M simultaneous separated communication signals for which the number N of first groups may be less than, equal to, or greater than the number M of second groups.

The present invention provides a wireless radiofrequency data communication system which is characterised in that the signal processing-unit is arranged to process, in use, the receive-signals on the basis of a Maximum Likelihood Detection method, such that, for each second group of the second groups, an individual communication channel is formed with the base-station, wherein these communication channels are generated simultaneously and separately from each other.

In this manner, multiple communication channels are realised on the same frequency, or within the same frequency-band, based on the principle that the signals can be separated thanks to the different characteristics of the transfer-functions. Due to the Maximum Likelihood detection technique, this holds for the cases wherein the number N of first groups is greater than, equal to, or less than the number M of second groups. Hence, the data communication capacity per frequency or frequency-band is indeed increased. The geometry of the configuration of the communication system determines the transfer functions that belong to the different travel-paths between the antennas of the first groups and the second groups in the base-station. These transfer functions are expressed by complex numbers. Each complex number expresses the transfer function between one antenna of one of the first groups and one antenna of the second group. The amplitude of the complex number is the attenuation of the signal's strength and the phase of the complex number is the phase modulation incurred during transmission along the travel-path. Since the used frequencies are relatively high, the transfer functions depend largely on the configuration.

An embodiment according to the invention is characterised in that each transmitter comprises means for modulating an information signal on a radiofrequency signal according to the Quadrature Amplitude Modulation (QAM) method, wherein so-called QAM-symbols are transmitted, and that each receiver comprises means for demodulating information signals from a received radiofrequency signal.

The Quadrature Amplitude Modulation is an amplitude- and/or phase-modulation technique in which information in binary format is modulated on a radiofrequency signal.

In a favourable embodiment of the invention, the wireless communication system is characterised in that the signal processing-unit is arranged to calculate, in use, a detection signal $X_{DET}$ according to $$x_{DET} = \arg_{over\ set} \min(\|r - H x^p_{SET}\|), \quad (I)$$

where $\arg_{over\ set} \min(\| \ldots \|)$ is a function which, according to (I), yields that vector $x_{DET}$ out of a set $x_{SET}$ of P vectors $x^p_{SET}$ (p=1, ... ,P) for which the length $\|r - H x^p_{SET}\|$ of the complex N-dimensional vector r–H $x^P_{SET}$ is minimal, wherein r is a complex N-dimensional vector $[r_1, \ldots, r_i, \ldots, r_N]^T$ with $r_i$ being the signal received by the $i^{th}$ first group of the N first groups, H is a complex [N×M] matrix containing transfer-functions $h_{im}$ (i=1,...,N; m=1,...,M), wherein $h_{im}$ is the transfer-function for transmission from the $m^{th}$ second group of the M second groups to the $i^{th}$ first group of the N first groups, and where $x^P_{SET}$ is the $p^{th}$ complex M-dimensional vector $[x^P_{SET,1}, \ldots, x^P_{SET,m}, \ldots, x^P_{SET,M}]^T$ of the set $X_{SET}$, wherein the vectors $x^P_{SET}$ in the set $X_{SET}$ contain possible combinations of values which can be assigned by the second groups to an information signal x, where x is a M-dimensional vector $[x_1, \ldots, x_m, \ldots, x_M]^T$ with $x_m$ being the information signal transmitted by the $m^{th}$ second group of the M second groups to the first groups and where $x_m$ is one individual communication signal. Equation (I) is based on the model $$r = Hx + n, \qquad (II)$$

where n is a complex N-dimensional noise vector $[n_1, \ldots, n_i, \ldots, n_N]^T$ containing noise terms picked up during reception. The model (II) gives the relation between the transmitted signal $x=[x_1, \ldots, x_m, \ldots, x_M]^T$ and the received signal $r=[r_1, \ldots, r_i, \ldots, r_N]^T$ in the base-station. The detection method according to the invention tries to match a fixed number of possible combinations of values for x in the equation (I). These possible value combinations are the vectors $x^P_{SET}$, (p=1,...,P), which all together constitute the set $X_{SET}$. The detection signal $x_{DET}$ is that vector $x^P_{SET}$ in the set $X_{SET}$ which minimizes the length of the vector $r-H\,x^P_{SET}$.

In a further embodiment the wireless radiofrequency data communication system is characterised in that the processing unit is arranged to apply, in use, the following approximation (III) in the calculation of (I)

$$\|r - Hx^P_{SET}\| = \sum_{i=1,\ldots,N} (\|\text{Real}([r - Hx^P_{SET}]_i)\| + \|\text{Im}([r - Hx^P_{SET}]_i)\|), \qquad (III)$$

wherein $$\sum_{i=1,\ldots,N} (\ldots)$$

is a summation over the index i from 1 to N over the argument $(\|\text{Real}([r-H\,x^P_{SET}]_i)\| + \|\text{Im}([r-H\,x^P_{SET}]_i)\|)$, where $\|(.)\|$ yields the absolute value of its input argument and where Real(...) is a function which, in equation (III), yields the real part of its complex argument $[r-H\,x^P_{SET}]_i$, with $[r-H\,x^P_{SET}]_i$ being the $i^{th}$ component of the complex N-dimensional vector $r-H\,x^P_{SET}$, and where Im(...) is a function which, in equation (III), yields the imaginary part of its complex argument $[r-H\,x^P_{SET}]_1$. The expression (III) offers a valuable approximation and simplification for the evaluation of equation (I).

An embodiment of the invention which is of special interest is a wireless radiofrequency data communication system characterised in that the set $X_{SET}$ comprises all possible combinations of values which can be assigned to the signal x by the second groups.

In a preferred embodiment of the invention the wireless radiofrequency data communication system is characterised in that the signal processing-unit is arranged to find, in use, the detection signal $x_{DET}$ according to a Reduced Search Technique wherein a search-tree is passed through according to the following steps 1 to 7:

Step 1: calculate the lengths of the complex vectors v corresponding to all combinations of possible values which can be assigned to $[x_1, \ldots, x_L]$, wherein v is given by $$v = \left(r - \sum_{i=1,\ldots,L} h_i * x^P_{SET,i}\right), \qquad (IV)$$

where $$\sum_{i=1,\ldots,L} (\ldots)$$

is a summation over the index i from 1 to L over the complex argument $[h_i * x^P_{SET,i}]$ and where $h_i$ is the $i^{th}$ column $[h_{1,i}, \ldots, h_{N,1}]^T$ of the matrix H;

Step 2: select the K combinations of values for $[x^P_{SET,1}, \ldots, x^P_{SET,L}]$ corresponding to the K smallest lengths of v as well as the K vectors v itself and set m=L+1;

Step 3: calculate the lengths of the C*K new vectors v given by $$v = v_{old} - h_m * x^P_{SET,m}, \qquad (V)$$

where $v_{old}$ is one of the K vectors v resulting from the preceding step and where $h_m$ is the $m^{th}$ column of H;

Step 4: select those K combinations of values for $[x^P_{SET,1}, \ldots, x^P_{SET,m}]$ that correspond to the K smallest lengths of v as well as the K vectors v itself and set m=$m_{old}$+1, where $m_{old}$ is m from the preceding step;

Step 5: if m<M then go to Step 3, else go to step 6;

Step 6: calculate the lengths of the C*K new vectors v given by $$v - v_{old} - h_M * x^P_{SET,M}, \qquad (VI)$$

Step 7: the detection signal $x_{DET}$ is determined as that combination of values $x_{DET}=[x^P_{SET,1}, \ldots, x^P_{SET,M}]$ which corresponds to the vector v with the smallest length, wherein K and L are predetermined fixed integer values which control the size P of the set $X_{SET}$ and wherein the constellation size C of the system is the number of values $x^P_{SET,m}$ which can be assigned by one of the second groups to one component $x_m$(m=1,...,M) of x and where $V_{old}$ is one of the K vectors v resulting from Step 3, the calculated detection signal $x_{DET}$ is the combination of values $x^P_{SET}$ corresponding to the smallest vector v. In this manner the requisite number of calculations for obtaining the detection signal $x_{DET}$ is known on beforehand, since the number P of vectors in the set $X_{SET}$ is pre-determined by selecting values for K and L.

An alternative embodiment according to the invention is characterised in that the signal processing-unit is arranged to find, in use, the detection signal $x_{DET}$ according to a Reduced Search Technique wherein a search-tree is passed through according to the following steps 1 to 7:

Step 1: calculate the values of the lengths of the C vectors v according to the C possible values $x^P_{SET,1}$ $$v = (r - h_1 * x^P_{SET,1}), \qquad (VII)$$

wherein $h_1$ is the first column of H;

Step 2: select those combinations of values for $x^P_{SET,1}$ for which the lengths of v are smaller than T, as well as the corresponding vectors v and set m=2;

Step 3: calculate the lengths of the new vectors v given by $$v = v_{old} - h_m * x^P_{SET,\, m},\qquad \text{(VIII)}$$

wherein $v_{old}$ is one of the vectors v resulting from the preceding step and where $h_m$ is the $m^{th}$ column of H, and adjust the threshold T;

Step 4: select those combinations of values for $[x^P_{SET,\,1}, \ldots, x^P_{SET,\,m}]$ for which v is smaller than T, discard the other combinations and set $m=m_{old}+1$, where $m_{old}$ is m from the preceding step;

Step 5: if m<M then go to Step 3, else go to step 6,

Step 6: calculate the lengths of the new vectors v given by $$v = v_{old} - h_M * x^P_{SET,\, M},\qquad \text{(IX)}$$

Step 7: the detection signal $x_{DET}$ is determined as that combination of values $x_{DET} = [x^P_{SET,\,1}, \ldots, x^P_{SET,\,M}]$ which corresponds to the vector v with the smallest length, wherein T is a predetermined fixed threshold value which controls the size P of the set $X_{SET}$ and wherein the constellation size C of the system is the number of values $x^P_{SET,\,m}$ which can be assigned by one of the second groups to one component $x_m$ (m=1, ..., M) of x, and wherein $v_{old}$ is one of the vectors v resulting from step 3, the calculated detection signal $x_{DET}$ is the combination of values $x^P_{SET}$ corresponding to the smallest vector v. In this embodiment the number of requisite calculations for obtaining the detection signal $x_{DET}$ is not known beforehand since the number of vectors v which are selected in the respective steps 2 and 4 may vary from step step-to-step, depending on the adjusted value for the threshold T and the noise n in the signal r.

A further embodiment of the wireless radiofrequency data communication system according to the invention is characterised in that the signal processing-unit is arranged to find, in use, the detection signal $x_{DET}$ according to a Reduced Search Technique which also comprises the following steps:

Step A1: calculate an inner product z of the vector r with the $u^{th}$ column $h_u$ of the matrix H, where u is an integer $1 \le u \le M$, according to:

$$z = h^*_u r,\qquad \text{(X)}$$

where $h^*_u$ is the complex conjugated and transposed of $h_u$;

Step A2: calculate $C^{M-1}$ terms Interf corresponding to all possible value combinations which can be assigned to $[x_1, \ldots, x_{u-1}, x_{u+1}, \ldots, x_M]$, wherein the terms Interf are defined according to:

$$\text{Interf} = \sum_{(i=1,\ldots,M \,\wedge\, i\neq u)} x_i * (h^*_u * h_i),\qquad \text{(XI)}$$

wherein $$\sum_{(i=1,\ldots,M \,\wedge\, i\neq u)} (\ldots)$$

is a summation over the index i from 1 to M with the exception of the integer u;

Step A3: estimate, on the basis of the equations (X), (XI) and z' according to:

$$z' = \text{Interf} + x_u * (h^*_u * h_u),\qquad \text{(XII)}$$

where z' is an approximation of z, the value for $x_u$ corresponding to each of the value combinations $[x_1, \ldots, x_{u-1}, x_{u+1}, \ldots, x_M]$, and constitute a test set $X_{SET}$ comprising $C^{M-1}$ vectors $x^P_{SET}$, wherein each vector $x^P_{SET}$ represents a value combination $[x_1, \ldots, x_{u-1}, x_u, x_{u+1}, \ldots, x_M]$;

Step A4: determine the detection signal $X_{DET}$ according to equation (I), wherein the test set is defined with the $C^{M-1}$ vectors $x^P_{SET}$ from the preceding step.

In an embodiment of the wireless radiofrequency data communication system according to the invention the multiple N of first groups exceeds the multiple M of second groups.

In another embodiment of the wireless radiofrequency data communication system according to the invention the multiple N of first groups is less than the multiple M of second groups.

In still another embodiment of the wireless radiofrequency data communication system according to the invention the multiple N of first groups is equal to the multiple M of second groups.

BRIEF DESCRIPTION OF THE DRAWINGS

In the accompanying drawings, in which certain modes of carrying out the present invention are shown for illustrative purposes.

DETAILED DESCRIPTION

Figure 1:
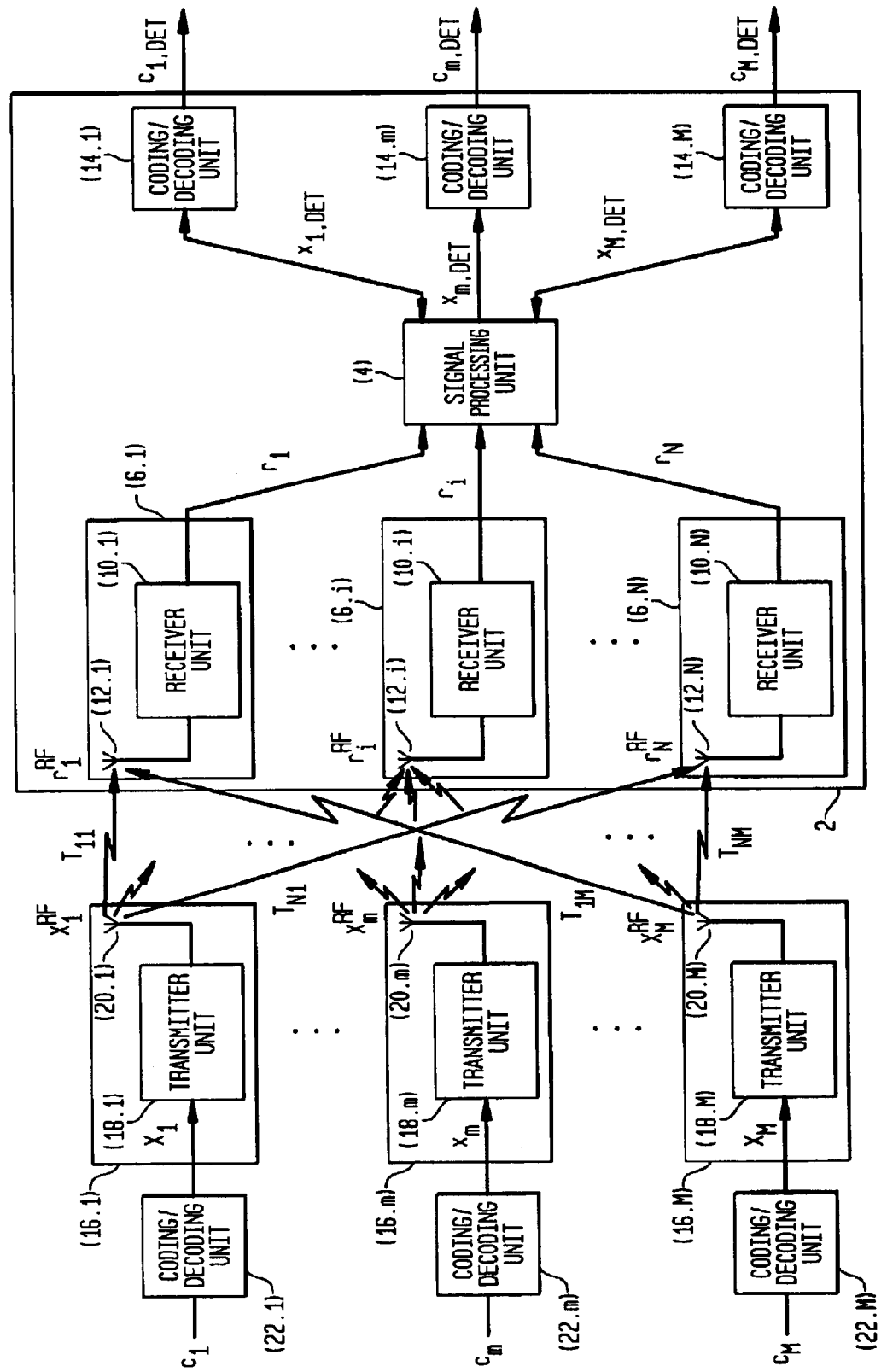
FIG. 1 is a diagram schematically showing a wireless data communication system according to the invention.

An embodiment of a wireless radiofrequency data communication system according to the invention is shown in FIG. 1. This wireless radiofrequency data communication system comprises a base-station 2 which comprises a signal processing-unit 4 and multiple first groups 6.i (i=1,2, ..., N). Each first group 6.i comprises a receiver-unit 10.i provided with a receiver, and at least one antenna 12.i which is connected to the receiver-unit 10.i. In this example each first group 6.i comprises one antenna 12.i connected to the receiver-unit 10.i. The signal processing-unit 4 is at one side connected to each of the first groups 6.i, i=1,2, ..., N, and at another side connected to each of the coding/decoding-units 14.m, m=1,2, ..., M. Furthermore, the system comprises multiple second groups 16.m (m=1,2, ..., M), wherein each second group 16.m comprises at least a transmitter-unit 18.m and at least one antenna 20.m which is connected to said transmit-unit 18.m. Each of the second groups 16.m is connected with a coding/decoding-unit 22.m, m=1,2, ..., M.

In the configuration of FIG. 1 the second groups can belong to mobile communication stations. An example of this is the situation wherein notebooks are provided with at least one second group. In this situation the notebooks can communicate via the second groups to the base-station. The base-station can be an internet and/or an intranet server. In general the number M of second groups will vary during the operation of the base-station.

The second groups 16.m (m=1,2, . . . ,M) can simultaneously transmit radiofrequency signals on essentially the same radiofrequency or radiofrequency-band to the first groups 6.i. The radiofrequency signal which is transmitted from the second group 16.m travels from this second group along travel-paths $T_{im}$ (i=1,2, . . . ,N) to the respective first groups 6.i (i=1,2, . . . ,M). The travel-path $T_{im}$ is the travel-path from the second group 16.m to the first group 6.i. For each travel-path $T_{i,m}$ a transfer-function can be defined which is expressed with a complex number $h_{im}$. The amplitude of the $h_{im}$ is the attenuation of the signal's strength and the phase of $h_{im}$ is the phase modulation incurred during transmission along the travel-path. The processing-unit 4 comprises memory means provided with information about the transfer-functions of radiofrequency signals along said travel-paths. Furthermore the processing-unit 4 comprises processing means for processing receive-signals generated by each of the first groups.

In FIG. 1 a radiofrequency transmission signal $x^{RF}_m$ is generated by the second group 16.m and transmitted to the first groups 6.i (i=1, . . . ,N). The generation of this radiofrequency transmission signal is as follows. The input to the coding/decoding-unit 22.m is a so-called Quadrature Amplitude Modulated symbol (short: QAM-symbol). This QAM-symbol is expressed as a complex number (an example of such a complex number is: 1+2j, where the real part of the QAM-symbol is 1 and the complex part is 2). Said QAM-symbol is modulated by the coding/decoding-unit 22.m on a low-frequency signal, which yields $x_m$. This data-signal $x_m$ is the input of the transmit-unit 18.m, which transmit-unit modulates $x_m$ on a radiofrequency signal yielding the radiofrequency signal $x^{RF}_m$. The radiofrequency signal $x^{RF}_m$ is transmitted by the antenna 20.m to the first groups.

Each first group 6.i, i=1, . . . ,N receives a radiofrequency signal $r^{RF}_i$ in the antenna 12.1. This signal $r^{RF}_i$ is a result of the interference of all transmitted signals $x^{RF}_m$, m=1, . . . ,M. The signal $r^{RF}_i$ is demodulated by the receiver-unit 10.i to a low-frequency receive-signal $r_i$ which contains the modulated information of data-signal $x_m$. The N receive-signals $r_i$, i=1, . . . ,N are fed to the input of the signal processing-unit 4. The signal processing unit 4 calculates M output signals $x_{i,DET}$, i=1, . . . ,M. Each output signal $x_{i,DET}$ is an estimation for the data-signal $x_i$. The detection signal $x_{i,DET}$ is inputted to the coding/decoding-unit 14.i, i=1, . . . ,M, which unit generates the QAM-symbol $c_{i,DET}$. This QAM-symbol is an estimation for the QAM-symbol $c_i$.

The operation of the signal processing unit 4 will now be elucidated on the basis of a mathematical framework. The relation between the data-signals $x_m$, m=1, . . . ,M and the receive-signals $r_i$, i=1, . . . ,N is given with the following vector equation:

$$r = Hx + n,\qquad(XIII)$$

where r is a N-dimensional complex vector $[r_1, \ldots, r_i, \ldots, r_N]^T$, where H is a complex [N×M]-matrix containing the transfer-functions $h_{im}$, (i=1, . . . ,N; m=1, . . . ,M) and wherein x is a M-dimensional complex vector $[x_1, \ldots, x_m, \ldots, x_M]^T$. The noise vector n is a N-dimensional complex vector $[n_1, \ldots, n_i, \ldots, n_N]^T$, with $n_i$ being the noise term picked up during reception of the signal $r^{RF}_i$. The signal processing unit 4 calculates detection signals $x_{DET} = [x_{1,DET}, \ldots, x_{M,DET}]^T$ which are estimations for the data-signals x. These calculations are performed according to a Maximum Likelihood method. It has to be noted here that the detection signals are sometimes called Maximum Likelihood signals. One important aspect of the Maximum Likelihood approach is that use is made of the knowledge that the QAM-symbol $c_m$, m=1, . . . ,M can only take on a limited number of values. This number is called the constellation size C of the second group. So, the data-signal $x_m$ for a particular m can only take on C different values. This implies that the total number of possible different value combinations of the data-vector x is $C^M$. All these $C^M$ different value combinations together constitute the test set $X_{SET}$, wherein the $p^{th}$ element of the set is a value combination which is a complex M-dimensional vector $x^p_{SET}$. This implies that the signal processing unit can calculate a detection signal by trying to match all elements of the set and choosing the best fit according to (XIII). In order to save processing time, it is also possible to match only the elements of a subset of the set. For the latter approach, several reduced search techniques are developed according to different embodiments of the invention. The detection signals that are found by matching elements of the set are called Maximum Likelihood signals.

The signal processing-unit 4 can find the Maximum Likelihood detection signal in particular according to the following algorithm. This algorithm will be described in mathematical terms. The detection signals $x_{DET}$ are calculated by the signal-processing-unit 4 according to $$x_{DET} = \arg_{over\ set}\min(\|r - Hx^p_{SET}\|),\qquad(XIV)$$

where $\arg_{over\ set} \min(\|\ldots\|)$ is a function which, according to (XIV), yields that vector $x_{DET}$ out of a set $X_{SET}$ of P vectors $x^p_{SET}$ (p=1, . . . ,P) for which the length $\|r-H\ x^p_{SET}\|$ of the complex N-dimensional vector $r-H\ x^p_{SET}$ is minimal and where $x^p_{SET}$ is the $p^{th}$ complex M-dimensional vector $[x^p_{SET, 1}, \ldots, x^p_{SET, m}, \ldots, x^p_{SET, M}]^T$ of the set $X_{SET}$, wherein the vectors $x^p_{SET}$ in the set $X_{SET}$ contain possible combinations of values which can be assigned by the second groups to an information signal x, where $x_m$ is one individual communication signal. Since the data-signals $x_m$, m=1, . . . ,M, are transmitted simultaneously, each detection signal $x_{m,DET}$ results in the generation of one of M simultaneous data communication signals.

Figure 2:
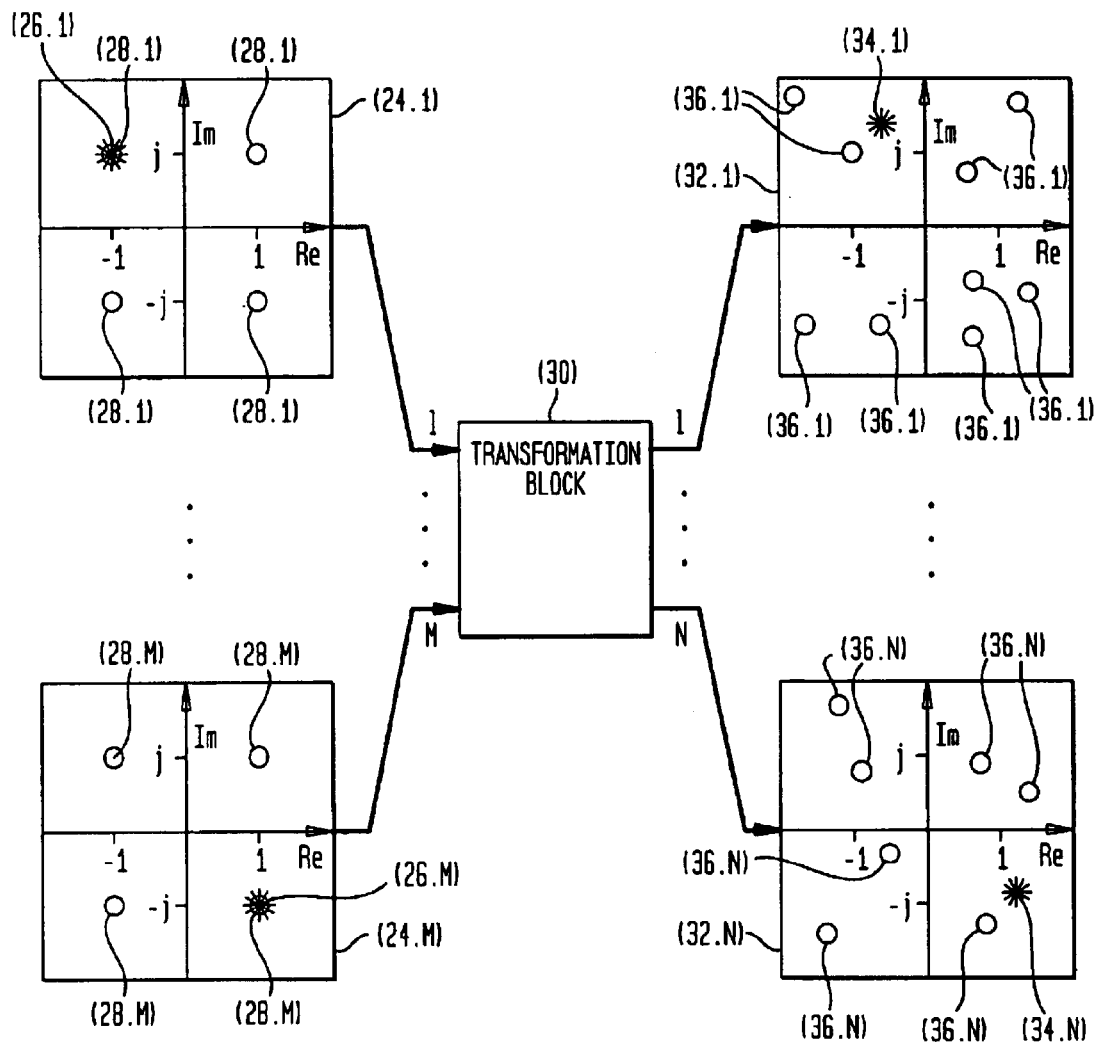
FIG. 2 is a diagram illustrating the use of Quadrature Amplitude Modulation (QAM) symbols by the wireless data communication system of FIG. 1.

The principle of a Maximum Likelihood Detection method will now be illustrated with the schematic of FIG. 2. This figure shows QAM-symbols $c_m$, m=1, . . . ,M, which are the possible inputs to the coding/decoding units 22.m. The QAM-symbol $c_1$ is marked with a * 26.1 and equals (−1+j). Each diagram 24.m contains a QAM-symbol $c_m$ which can take on 4 different values. These possible values are marked with 0 28.m. The actual possible values for the QAM-symbols are (1+j), (−1+j), (1−j), and (−1−j). Thus here the constellation size C of the second groups is C=4. As explained previously, the QAM-symbols are the information that is modulated on the corresponding data signal $x_m$. However, from a mathematical point of view, the QAM-symbols are identical to the signals $x_m$. So, the value of the low-frequency signal $x_1$ in the example of FIG. 2 is (−1+j) and the value of $x_M$ is (1−j). The transmission and the subsequent reception of the QAM-symbols to the first groups 6.i takes place via radiofrequency carrier signals. The mathematical formulation of this transmission is a transformation of the vector x with the matrix H and an addition of noise n, see equation (XIII). This is illustrated with the transformation block 30 which contains M input-signals $x_m$, m=1, . . . ,M, and N output-signals $r_i$, i=1, . . . ,N. The values of the output signals $r_i$, i=1, . . . ,N are represented with * marks 34.i in the diagrams 32.i. Each diagram 32.i contains one received component $r_i$ of r. As a consequence of the time-varying nature of H and as a consequence of noise the values of $r_i$, will generally vary, even if the QAM-symbols $c_m$ would have continuously constant values. Now the signal processing unit 4 calculates the transformation of all possible value combinations in the test set (or a subset of the test set) of the QAM-symbols, in order to try these elements in (XIV), according to:

$$r^p{}_{SP} = H\, x^p{}_{SET}, p=1,\ldots,P. \qquad (XV)$$

The complete test set comprises $P=C^M$ combinations but, for a subset of the test set, $P<=C^M$). Equation (XV) yields possible receive-signals in the situation of absence of noise. These signals are indicated with 0 marks 36.i in the diagrams 32.i. Finally, the Maximum Likelihood solution is that value combination $x^p{}_{SET}$ in the test set, which corresponds to the 0 marks of its components, for which the value $$\|r - r^p{}_{SP}\|, \qquad (XVI)$$

is minimal. In the case in which the vectors r and $r^p{}_{SP}$ comprise only one component, the Maximum Likelihood solution is found with the 0 in diagram 32.1 which is closest to the *.

Figure 3:
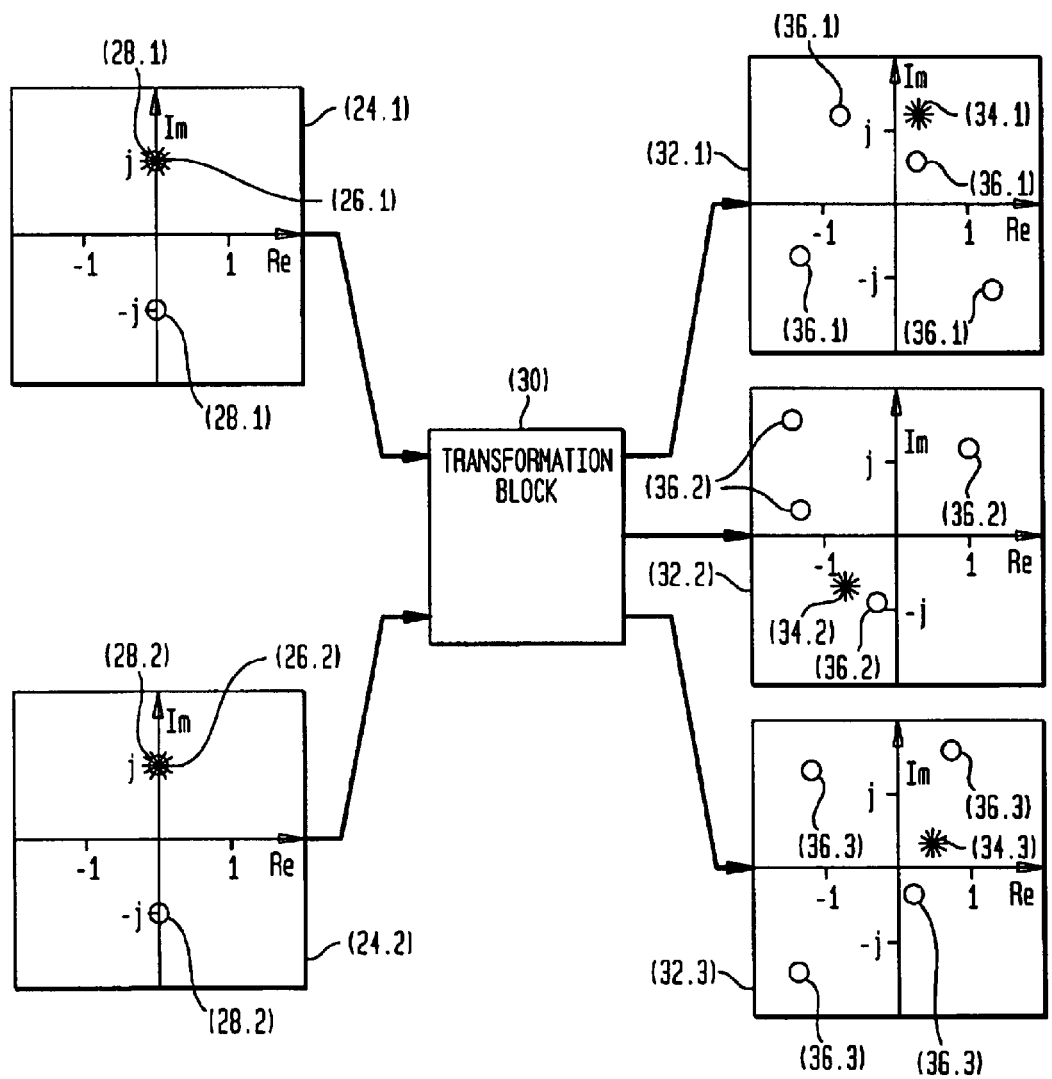
FIG. 3 is a diagram illustrating the use of Quadrature Amplitude Modulation (QAM) symbols by a wireless data communication system which contains three first groups and two second groups.
Figure 4:
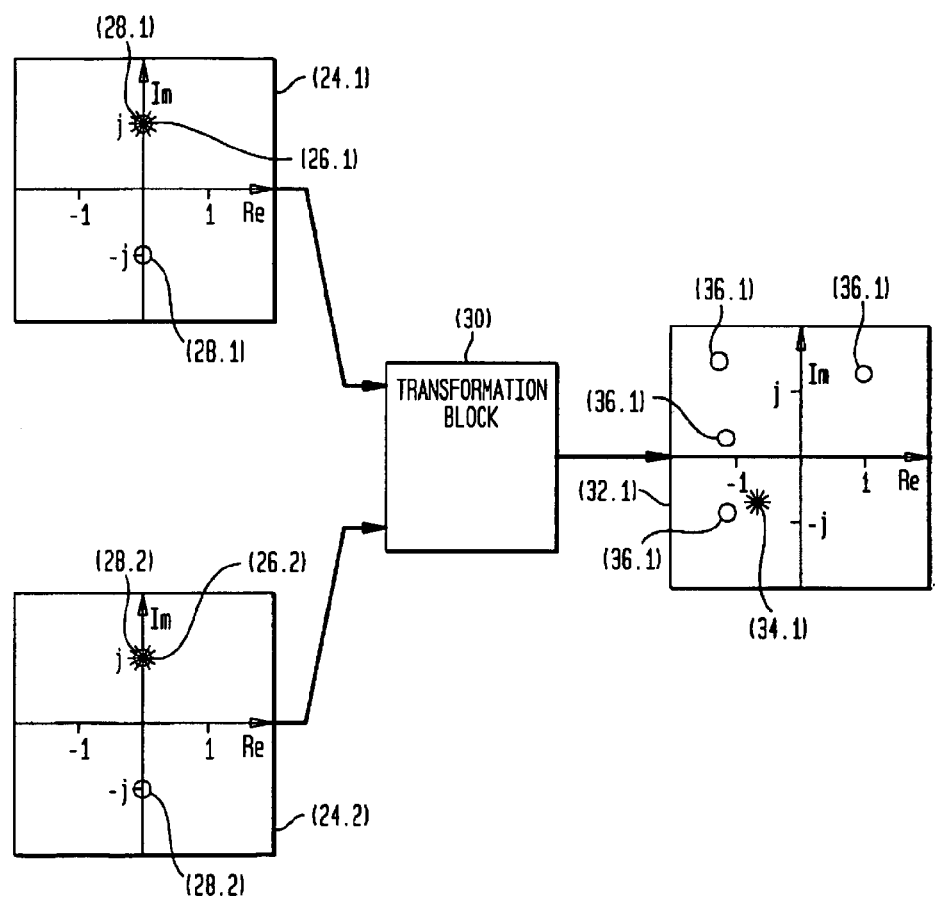
FIG. 4 is a diagram illustrating the use of Quadrature Amplitude Modulation (QAM) symbols by a wireless data communication system which contains one first group and two second groups.

FIG. 3 gives a more detailed example of a wireless data communication system according to the invention, where the number of first groups N=3, the number of second groups M=2, the constellation size C=2. In total, there are 4 possible value combinations which can be assigned to the data-signals x. In this example, the data-signal [26.1, 26.2] is $x=[(0+j), (0+j)]^T$. Since the number of first groups is greater than the number of second groups, a robust communication system, fairly insensitive to noise, is realised. The possible values for the components of the data-signals x are schematically indicated with 0 marks 28.1 in the diagrams 24.1 and 24.2 in FIG. 3. The test set comprises all these possible value combinations (P=4), so the test set $X_{SET}$ is given with:

$$X_{SET} = \{x^1{}_{SET};\ x^2{}_{SET};\ x^3{}_{SET};\ x^4{}_{SET}\},$$

where:

$$x^1{}_{SET} = [(0+j), (0+j)]^T,$$

$$x^2{}_{SET} = [(0-j), (0+j)]^T,$$

$$x^3{}_{SET} = [(0+j), (0-j)]^T,$$

$$x^4{}_{SET} = [(0-j), (0-j)]^T, \qquad (XVII)$$

wherein the notation $X_{SET} = \{..;..\}$ means that $X_{SET}$ is the set of all vectors which are enumerated between the brackets {. }. In this case, the matrix H containing the transfer-functions is a complex [3 ×2]-matrix. The transformation of the elements of the test set $X_{SET}$ (see (XVII)) according to (XV) results in 4 vectors $r^p{}_{SP}$, each of which has 3 components. The values of the respective components of the vectors $r^p{}_{SP}$ are depicted in the respective diagrams 32.1, 32.2, and 32.2 of FIG. 3 and marked with 0 marks 36.i, i=1,2,3. The transformation of the data-signal x according to (XIII) yields the receive signal r. The respective components of this signal are indicated with * marks 34.i in the respective diagrams 32.1, 32.2, and 32.2 of FIG. 3. Note that despite the relation $x = x^1{}_{SET}$, the signal r is unequal to $r^1{}_{SP}$ as a consequence of the noise n. The Maximum Likelihood solution is found according to (XIV). Note that 2 simultaneous data communication channels are generated, which channels are the components of the vector x (the first channel is $x_1$ and the second channel is $x_2$). FIG. 4 gives an example of a wireless data communication system in which there are more second groups (M=2) than first groups (N=1). However, with a detection algorithm according to the invention, the signal processing-unit sometimes can recover the transmitted M-dimensional data-signal x. In this case, the data-signal [26.1, 26.21 ] is $x=[(0+j), (0+J)]^T$ The constellation size C=2. So, there are 4 possible value combinations which can be assigned to the data-signals x. The possible values for the components of these data-signals are indicated with 0 marks 28.1 in the diagrams 24.1 and 24.2 of FIG. 4. The test set comprises all these possible value combinations (P=4), so the test set $X_{SET}$ is given with (XVII). In this example, the matrix H containing the transfer-functions is a complex [1×2]-matrix:

$$H = [h_{11}\ h_{12}] = [h_1\ h_2], \qquad (XVIII)$$

where the column $h_1$ is identical to the scalar $h_{11}$ and the column $h_2$ is identical to the scalar $h_{12}$. The transformation of the elements of the test set $X_{SET}$ (see (XVII)) according to (XV) results in 4 scalars $r^p{}_{SP}$. The values of these 4 scalars $r^p{}_{SP}$ are depicted in the diagram 32.1 of FIG. 4 and marked with 0 marks 36.1. The transformation of the data-signal x according to (XIII) yields the receive signal r. In this example, this signal is also a scalar which is indicated with a * mark 34.1 in the diagram 32.1 of FIG. 4. Note that, despite the relation $x = x^1{}_{SET}$, signal r is unequal to $r^1{}_{SP}$ as a consequence of the noise n. The Maximum Likelihood solution is found according to (XIV) and is given with the 0 mark which is closest to the * mark 34.1.

The calculations of the signal processing unit based on the equation (XIV) can be approximated with the following expression in order to save processing time:

$$\|r - Hx^p_{SET}\| = \sum_{i=1,\ldots,N} (\|\mathrm{Real}([r - Hx^p_{SET}]_i)\| + \|\mathrm{Im}([r - Hx^p_{SET}]_i)\|), \qquad (XIX)$$

wherein $$\sum_{i=1,\ldots,N} (\ldots)$$

is a summation over the index i from 1 to N over the argument $(\|\mathrm{Real}([r - H\, x^p{}_{SET}]_i)\| + \|\mathrm{Im}([r - H\, x^p{}_{SET}]_i)\|)$, where $\|(.)\|$ yields the absolute value of its input argument and where Real( . . . ) is a function which, in equation (XIX), yields the real part of its complex argument $[r - H\, x^p{}_{SET}]_i$, with $[r - H\, x^p{}_{SET}]_i$ being the $i^{th}$ component of the complex N-dimensional vector $r - H\, x^p{}_{SET}$, and where Im( . . . ) is a function which, in equation (XIX), yields the imaginary part of its complex argument $[r - H\, x^p{}_{SET}]_1$.

The signal processing-unit 4 finds the Maximum Likelihood detection signal according to (XIV). With this equation, the detection signal is found by trying to fit elements of the test set $X_{SET}$. Since the test set comprises $C^M$ elements, this can easily lead to a huge amount of processing time. To reduce the processing time, an embodiment of the invention provides an algorithm that can limit the search to a subset of $X_{SET}$. A first algorithm, which provides an intelligent way of choosing a pre-determined subset of $X_{SET}$, is given below and is called a Reduced Search Technique. In this Reduced Search technique, a search-tree is passed through according to the following steps 1 to 7:

Step 1: calculate the lengths of the complex vectors v corresponding to all combinations of possible values which can be assigned to $[x_1, \ldots, x_L]$. The vector v is given with $$v = \left(r - \sum_{i=1,\ldots,L} h_i * x^p_{SET,i}\right), \quad (XX)$$

where $\Sigma_i=1, \ldots, L(\ldots)$ is a summation over the index i from 1 to L over the complex argument $[h_i * x^P_{SET, i}]$ and where $h_i$ is the $i^{th}$ column $[h_{1,i}, \ldots, h_{N,i}]^T$ of the matrix H;

Step 2: Select the K combinations of values for $[x^p_{SET, 1}, \ldots, x^P_{SET, L}]$ corresponding to the K smallest lengths of v as well as the K vectors v itself and set m=L+1;

Step 3: Calculate the lengths of the C*K new vectors v given by $$v = v_{old} - h_m * x^p_{SET, m}, \quad (XXI)$$

where $v_{old}$ is one of the K vectors v resulting from the preceding step and where $h_m$ is the $m^{th}$ column of H;

Step 4: Select those K combinations of values for $[x^p_{SET, 1}, \ldots, x^P_{SET, m}]$ that correspond to the K smallest lengths of v as well as the K vectors v itself and set m=$m_{old}$+1, where $m_{old}$ is m from the preceding step;

Step 5: If m<M then go to Step 3, else go to step 6;

Step 6: Calculate the lengths of the C*K new vectors v given by $$v = v_{old} - h_M * x^p_{SET,M}, \quad (XXII)$$

Step 7: the detection signal $x_{DET}$ is determined as that combination of values $x_{DET}=[x^P_{SET, 1}, \ldots, x^P_{SET, M}]$ which corresponds to the vector v with the smallest length, wherein K and L are predetermined fixed integer parameters which control the size P of the set $X_{SET}$ and where $v_{old}$ is one of the K vectors v resulting from Step 3, the calculated detection signal $x_{DET}$ is that element of the set $X_{SET}$ for which the vector v is smallest. The principle of this reduced search technique is schematically illustrated in diagram 38 of FIG. 5 (according to the example of FIG. 4). In this example, the pre-determined parameter L=1 and K=4. Furthermore, the constellation size C=2, the number of second groups M=2, the number of first groups N=1, the matrix H is given with (XVIII), and the test set is defined with (XVII). The received vector r is a scalar r. The first stage 40 of the algorithm is to evaluate (XX). This results in principle in four lengths v1, v2, v3, and v4 corresponding to four vectors v (note that in this example v and $h_1$ and $h_2$ are all scalars):

$$v1 = \|r - h_1 * x^1_{SET,1}\| = \|r - h_1 * j\| \quad (XXIII)$$

$$v2 = \|r - h_1 * x^2_{SET,1}\| = \|r - h_1 * (-j)\|$$

$$v3 = \|r - h_1 * x^3_{SET,1}\| = \|r - h_1 * j\| = v1$$

$$v4 = \|r - h_1 * x^4_{SET,1}\| = \|r - h_1 * (-j)\| = v2.$$

Figure 5:
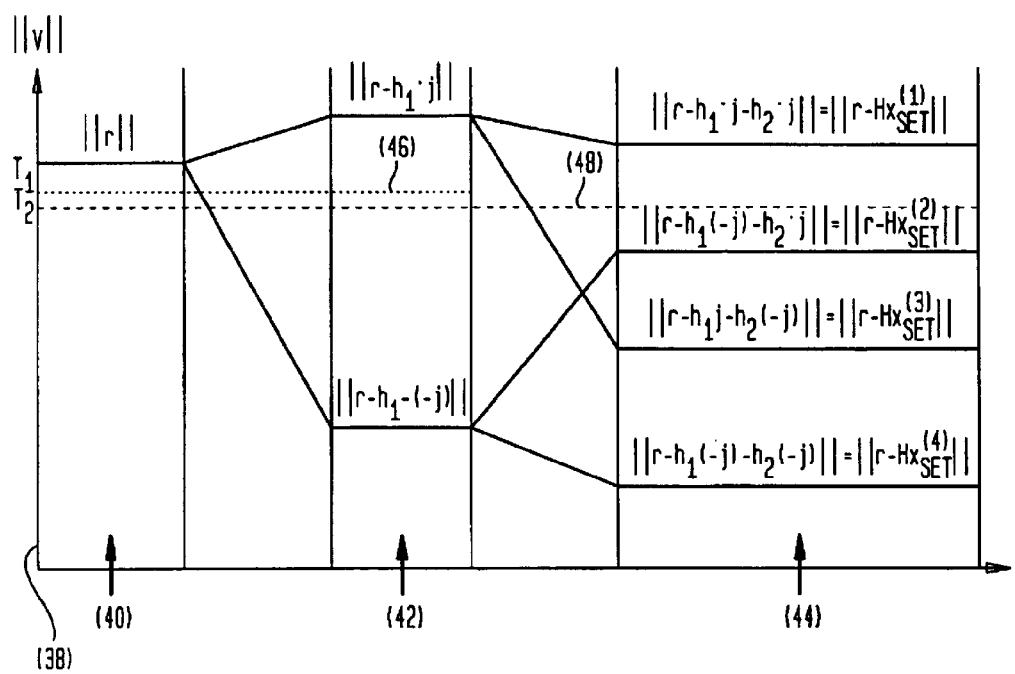
FIG. 5 is a diagram showing a search tree for illustrating the principle of Reduced Search Techniques in an embodiment of a wireless data communication system according to the invention.

These values v1 and v2 are shown in FIG. 5 in Step 1 of the algorithm 42. According to Step 2 both values v1 and v2 are selected. Hereafter, in Step 3, and in Step 4, the lengths of 4 new vectors v are calculated. These 4 new lengths are:

$$v1 = \|r - h_1 * j - h_2 * j\| \quad (XXIV)$$

$$v2 = \|r - h_1 * (-j) - h_2 * j\|$$

$$v3 = \|r - h_1 * j - h_2 * (-j)\|$$

$$v4 = \|r - h_1 * (-j) - h_2 * (-j)\|.$$

These four lengths 44 are depicted in FIG. 5. From Step 5 of the algorithm, a jump is made to Step 6. Finally, in Step 6 the calculation of the Maximum Likelihood detection signal is finished. In this case, the detection signal equals the test vector $x^4_{SET}$: $x_{DET}=x^4_{SET}$. In the algorithm stated above, the processing load of the signal processing-unit 4 is known beforehand and can be controlled with the parameters K and L. It is important to note that the detection signal comprises two components whereas the receive-signal r comprises only one component. So, in principle two separate simultaneous communication channels are formed. This example shows an important aspect of the nature of the detection algorithm according to certain embodiments of the invention, namely that the number of receivers may be less than the number of transmitters, and thus the number of receivers may also be less than the number of simultaneous communication channels.

In another embodiment of the wireless data communication system, the signal processing-unit 4 also finds the Maximum Likelihood detection signal according to (XIV). However, in this embodiment, the processing load of the signal processing-unit 4 is not known beforehand. The subset of the test set $X_{SET}$ is controlled with a real value threshold parameter T. The algorithm of this Reduced Search Technique is given below and comprises seven steps:

Step 1: Calculate the values of the lengths of the C vectors v according to the C possible values $x^P_{SET, 1}$ $$v=(r-h_1 * x^P_{SET, 1}). \quad (XXV)$$

Step 2: Select those combinations of values for $x^P_{SET, 1}$ for which the lengths of v are smaller than T, as well as the corresponding vectors v and set m=2;

Step 3: Calculate the lengths of the new vectors v given by $$v=v_{old}-h_m * x^P_{SET, m}, \quad (XXVI)$$

wherein $v_{old}$ is one of the vectors v resulting from the preceding step, and adjust the threshold T;

Step 4: Select those combinations of values for $[x^P_{SET, 1}, \ldots, x^P_{SET, m}]$ for which v is smaller than T, discard the other combinations and set m=$m_{old}$+1, where $m_{old}$ is m from the preceding step;

Step 5: If m<M then go to Step 3, else go to step 6,

Step 6: Calculate the lengths of the new vectors v given by $$v=v_{old}-h_M * x^P_{SET, M}, \quad (XXVII)$$

Step 7: the detection signal $x_{DET}$ is determined as that combination of values $x_{DET}=[x^P_{SET, 1}, \ldots, x^P_{SET, M}]$ which corresponds to the vector v with the smallest length, wherein $v_{old}$ is one of the vectors v resulting from step 3. The principle of this algorithm can also be illustrated with FIG. 5. The relevant parameters in the example of FIG. 5 are M=2, N=1, C=2. After the first Step, the 4 vectors v result, the lengths of these vectors are given with (XXIII). Also a pre-determined threshold value $T_1$ 46, which is applied in Step 2 is presented in the FIG. 5. As a result of the threshold $T_1$ 46, the branch $\|r-h_1*j\|$ (corresponding to v1 and v3 in (XXIII)) is discarded in the subsequent Steps. This means that only the lengths of the vectors v2 and v4 are calculated in Step 3 of the algorithm. Hereafter the threshold $T_1$ 46 is adjusted to the new threshold value $T_2$ 48 for the next Step 4. Next, the Steps 4 and 5 are performed, which includes the selection of the smallest vectors v, after which the algorithm jumps to Step 6. Step 6 selects the Maximum Likelihood detection signal between the two remaining test signals $x^2_{SET}$ and $x^4_{SET}$. The Maximum Likelihood solution appears to be $x_{DET}=x^4_{SET}$.

The embodiments of the wireless data communication system comprising the Reduced Search Techniques as described hereinbefore can also be applied with a modification for providing a further reduction in processing time. According to this modification, a number of test vectors in the test set reduced by a factor of C have to be checked out in equation (I). In this modification, the signal processing-unit is arranged to find, in use, the detection signal $x_{DET}$ according to a Reduced Search Technique which also comprises the following steps:

Step A1: calculate an inner product z of the vector r with the $u^{th}$ column $h_u$ of the matrix H, where u is an integer $1<u\leq M$, according to:

$$z=h^*_u r, \quad \text{(XXVIII)}$$

where $h^*_u$ is the complex conjugated and transposed of $h_u$;

Step A2: calculate $C^{M-1}$ terms Interf corresponding to all possible value combinations which can be assigned to $[x_1,\ldots,x_{u-1},x_{u+1},\ldots,x_M]$, wherein the terms Interf are defined according to:

$$Interf = \sum_{(i=1,\ldots,M \wedge i \neq u)} x_i * (h^*_u * h_i), \quad \text{(XXIX)}$$

wherein $$\sum_{(i=1,\ldots,M \wedge i \neq u)} (\ldots)$$

is a summation over the index i from 1 to M with the exception of the integer u;

Step A3: estimate, on the basis of the equations (XXVIII), (XXIX) and z' according to:

$$z'=Interf+x_u*(h^*_u*h_u), \quad \text{(XXX)}$$

where z' is an approximation of z, the value for $x_u$ corresponding to each of the value combinations $[x_1,\ldots,x_{u-1},x_{u+1},\ldots,x_M]$, and constitute a test set $X_{SET}$ comprising $C^{M-1}$ vectors $x^P_{SET}$, wherein each vector $x^P_{SET}$ represents a value combination $[x_1,\ldots,X_{u-1},x_u,x_{u+1},\ldots,x_M]$;

Step A4: determine the detection signal $X_{DET}$ according to equation (A), wherein the test set is defined with the $C^{M-1}$ vectors $x^P_{SET}$ from the preceding step. The approximation (XXX) is based on the assumption that the noise n can be neglected.

In accordance with the provisions of the patent statutes, the present invention has been described in what is considered to represent its preferred embodiments. However, it should be noted that the invention can be practised otherwise than as specifically illustrated and described without departing from its spirit or scope. For example, the wireless data communication system according to the invention can be used not only for simplex communication (from the second groups to the first groups) but also for duplex data communication (from the second groups to the first groups and vice versa). In the latter case the communication from the first groups to the second groups may or may not be arranged in such a way as to obtain a multiple of simultaneous data communication channels.

What is claimed:

1. Wireless radiofrequency data communication system comprising:

a base-station comprising a multiple of N first groups and a signal processing-unit comprising memory means and processing means, wherein each first group comprises a receiver-unit provided with a receiver and at least one antenna which is connected to the receiver-unit, wherein the signal processing-unit is connected with each of the first groups for processing receive-signals generated by each of the first groups, and a multiple of M second groups for transmitting radiofrequency signals to the first groups, wherein each second group comprises a transmitter-unit provided with a transmitter and at least one antenna which is connected to the transmitter-unit, wherein the memory means of the signal processing-unit are provided with means comprising information about the transfer-functions of radiofrequency signals from each of the antennas of the second groups to each of the antennas of the first groups, and wherein the transmitters and receivers operate on essentially the same radiofrequency or radiofrequency-band, characterised in that, the signal processing-unit is arranged to process, in use, the receive-signals on the basis of the Maximum Likelihood Detection method, such that for each second group an individual communication channel is formed with the base-station wherein these communication channels are generated simultaneously and separately from each other;

wherein each transmitter comprises means for modulating an information signal on a radiofrequency signal according to the Quadrature Amplitude Modulation (QAM) method, wherein so-called QAM-symbols are transmitted, and wherein each receiver comprises means for demodulating information signals from a received radiofrequency signal; and wherein the signal processing-unit is arranged to calculate, in use, a detection signal $x_{DET}$ according to $$x_{DET}=\arg_{over\ set}\min(\|r-H\ x^P_{SET}\|), \quad \text{(A)}$$

where $\arg_{over\ set}\min(\|\ldots\|)$ is a function which, according to (A), yields that vector $x_{DET}$ out of a set $X_{SET}$ of P vectors $x^P_{SET}$ (p=1,\ldots,P) for which the length $\|r-H\ x^P_{SET}\|$ of the complex N-dimensional vector $r-H\ x^P_{SET}$ is minimal, wherein r is a complex N-dimensional vector $[r_1,\ldots,r_i,\ldots,r_N]^T$ with $r_j$ being the signal received by the $i^{th}$ first group of the N first groups, H is a complex [N×M] matrix containing transfer-functions $h_{im}$ (i=1,\ldots,N; m=1,\ldots,M), wherein $h_{im}$ is the transfer-function for transmission from the $m^{th}$ second group of the M second groups to the $i^{th}$ first group of the N first groups, and where $x^P_{SET}$ is the $p^{th}$ complex M-dimensional vector $[x^P_{SET,\ 1},\ldots,x^P_{SET,\ m},\ldots,x^P_{SET,\ M}]^T$ of the set $X_{SET}$, wherein the vectors $x^P_{SET}$ in the set $X_{SET}$ contain possible combinations of values which can be assigned by the second groups to an information signal x, where x is a M-dimensional vector $[x_1,\ldots,x_m,\ldots,x_M]^T$ with $x_m$ being the information signal transmitted by the $m^{th}$ second group of the M second groups to the first groups and where $x_m$ is one individual communication signal.

2. Wireless radiofrequency data communication system according to claim 1, characterised in that, the processing unit is arranged to apply, in use, the following approximation (B) in the calculation of (A)

$$\|r - Hx^p_{SET}\| = \sum_{i=1,\ldots,N} (\|\text{Real}([r - Hx^p_{SET}]_i)\| + \|\text{Im}([r - Hx^p_{SET}]_i)\|), \quad (B)$$

wherein $\Sigma_i = 1, \ldots, N (\ldots)$ is a summation over the index i from 1 to N over the argument $(\|\text{Real}([r-H\ x^p_{SET}]_i)\| + \|\text{Im}([r-H\ x^p_{SET}]_i)\|)$, where $\|(.)\|$ yields the absolute value of its input argument end where $\text{Real}(\ldots)$ is a function which, in equation (B), yields the real part of its complex argument $[r-H\ x^p_{SET}]_i$, with $[r-H\ x^p_{SET}]_i$ being the $i^{th}$ component of the complex N-dimensional vector $r-H\ x^p_{SET}$, and where $\text{Im}(\ldots)$ is a function which, in equation (B), yields the imaginary part of its complex argument $[r-H\ x^p_{SET}]_i$.

3. Wireless radiofrequency data communication system according to claim 2, characterised in that, the set $X_{SET}$ comprises all possible combinations of values which can be assigned to the signal x by the second groups.

4. Wireless radiofrequency data communication system according to claim 2, characterised in that, the signal processing-unit is arranged to find, in use, the detection signal $x_{DET}$ according to a Reduced Search Technique wherein a search-tree is passed through according to the following steps 1 to 7:

Step 1: calculate the lengths of the complex vectors v corresponding to all combinations of possible values which can be assigned to $[x_1, \ldots, x_L]$, wherein v is given by $$v = \left(r - \sum_{i=1,\ldots,L} h_i * x^p_{SET,i}\right), \quad (C)$$

where $$\sum_{i=1,\ldots,L} (\ldots)$$

is a summation over the index i from 1 to L over the complex argument $[h_i * x^p_{SET,\ i}]$ and where $h_i$ is the $i^{th}$ column $[h_{1,i}, \ldots, h_{N,i}]^T$ of the matrix H;

Step 2: select the K combinations of values for $[x^p_{SET,\ 1}, \ldots, x^p_{SET,\ L}]$ corresponding to the K smallest lengths of v as well as the K vectors v itself and set m=L+1;

Step 3: calculate the lengths of the C*K new vectors v given by $$v = v_{old} - h_m * x^p_{SET,\ m}, \quad (D)$$

where $v_{old}$ is one of the K vectors v resulting from the preceding step and where $h_m$ is the $m^{th}$ column of H;

Step 4: select those K combinations of values for $[x^p_{SET,\ 1}, \ldots, x^p_{SET,\ m}]$ that correspond to the K smallest lengths of v as well as the K vectors v itself and set $m = m_{old} + 1$, where $m_{old}$ is m from the preceding step;

Step 5: if m<M then go to Step 3, else go to step 6;

Step 6: calculate the lengths of the C*K new vectors v given by $$v = v_{old} - h_M * x^p_{SET,\ M}, \quad (E)$$

Step 7: the detection signal $x_{DET}$ is determined as that combination of values $x_{DET} = [x^p_{SET,\ 1}, \ldots, x^p_{SET,\ M}]$ which corresponds to the vector v with the smallest length, wherein K and L are predetermined fixed integer values which control the size P of the set $X_{SET}$ and wherein the constellation size C of the system is the number of values $x^p_{SET,\ m}$ which can be assigned by one of the second groups to one component $x_m (m=1, \ldots, M)$ of x and where $v_{old}$ is one of the K vectors v resulting from Step 3, the calculated detection signal $x_{DET}$ is the combination of values $x^p_{SET}$ corresponding to the smallest vector v.

5. Wireless radiofrequency data communication system according to claim 2, characterised in that, the signal processing-unit is arranged to find, in use, the detection signal $x_{DET}$ according to a Reduced Search Technique wherein a search-tree is passed through according to the following steps 1 to 7:

Step 1: calculate the values of the lengths of the C vectors v according to the C possible values $x^p_{SET,\ 1}$ $$v = (r - h_1 * x^p_{SET,\ 1}), \quad (F)$$

wherein $h_1$ is the first column of H;

Step 2: select those combinations of values for $x^p_{SET,\ 1}$ for which the lengths of v are smaller than T, as well as the corresponding vectors v and set m=2;

Step 3: calculate the lengths of the new vectors v given by $$v = v_{old} - h_m * x^p_{SET,\ m}, \quad (G)$$

wherein $v_{old}$ is one of the vectors v resulting from the preceding step and where $h_m$ is the $m^{th}$ column of H, and adjust the threshold T;

Step 4: select those combinations of values for $[x^p_{SET,\ 1}, \ldots, x^p_{SET,\ m}]$ for which v is smaller than T, discard the other combinations and set $m = m_{old} + 1$, where $m_{old}$ is m from the preceding step;

Step 5: if m<M then go to Step 3, else go to step 6,

Step 6: calculate the lengths of the new vectors v given by $$v = v_{old} - h_M * x^p_{SET,M}, \quad (H)$$

Step 7: the detection signal $x_{DET}$ is determined as that combination of values $x_{DET} = [x^p_{SET,\ 1}, \ldots, x^p_{SET,\ M}]$ which corresponds to the vector v with the smallest length, wherein T is a predetermined fixed threshold value which controls the size P of the set $X_{SET}$ and wherein the constellation size C of the system is the number of values $x^p_{SET,\ m}$ which can be assigned by one of the second groups to one component $x_m (m=1, \ldots, M)$ of * x, and wherein $v_{old}$ is one of the vectors v resulting from step 3, the calculated detection signal $x_{DET}$ is the combination of values $x^p_{SET}$ corresponding to the smallest vector v.

6. Wireless radiofrequency data communication system according to claim 2, characterised in that, the signal processing-unit is arranged to find, in use, the detection signal $x_{DET}$ according to a Reduced Search Technique which at least comprises the following steps:

Step A1: calculate the inner product z between the vector r and the $u^{th}$ column $h_u$ of the matrix H, where u is an integer 1(u(M, according to:

$$z = h^*_u r, \quad (I)$$

where $h^*_u$ is the complex conjugated and transposed of $h_u$;

Step A2: calculate $C^{M-1}$ terms Interf corresponding to all possible value combinations which can be assigned to $[x_1, \ldots, x_{u-1}, x_{u+1}, \ldots, x_M]$, wherein the terms Interf are defined according to:

$$\text{Interf} = \sum_{(i=1,\ldots,M \wedge i \neq u)} x_i * (h^*_u * h_i), \quad (J)$$

wherein $$\sum_{(i=1,\ldots,M \wedge i \neq u)} (\ldots)$$

is a summation over the index i from 1 to M with the exception of the integer u;

Step A3: estimate, on the basis of the equations (I), (J) and z' according to:

$$z' = \text{Interf} + x_u * (h^*_u * h_u), \quad (K)$$

where z' is an approximation of z, the value for $x_u$ corresponding to each of the value combinations $[x_1, \ldots, x_{u-1}, x_{u+1}, \ldots, x_M]$, and constitute a test set $X_{SET}$ comprising $C^{M-1}$ vectors $x^P_{SET}$, wherein each vector $x^P_{SET}$ represents a value combination $[x_1, \ldots, x_{u-1}, x_u, x_{u+1}, \ldots, x_M]$;

Step A4: determine the detection signal $X_{DET}$ according to equation (I), wherein the test set is defined with the $C^{M-1}$ vectors $x^P_{SET}$ from the preceding step.

7. A method of decoding data encoded in a plurality of transmitted signals transmitted by one or more transmitters and received by one or more receivers as a plurality of received signals, the transmitted signals having encoded therein a plurality of symbols, the method comprising:
(a) calculating a first vector length for each of a plurality of complex vectors corresponding to a constellation having a plurality of combinations of possible data values;
(b) selecting a subset of the combinations based on the first vector lengths calculated in step (a);
(c) calculating, for the first transmitter, a second vector length for each complex vector corresponding to a combination in the subset;
if there are one or more other transmitters, then, for each other transmitter, implementing steps (d) and (e), wherein:
step (d) comprises reducing the subset based on the second vector lengths calculated in step (c); and
step (e) comprises calculating, for a current transmitter, a second vector length for each complex vector corresponding to a combination in the reduced subset; and
(f) generating the data based on the combination of possible data values that corresponds to the complex vector having the smallest second vector length in the subset.

8. The invention of claim 7, wherein:
the subset of combinations selected in step (b) corresponds to a first specified number of complex vectors having the smallest first vector lengths; and
the reduced subset of combinations selected in step (d) corresponds to a second specified number of complex vectors having the smallest second vector lengths.

9. The invention of claim 8, wherein the method is performed with knowledge, prior to the occurrence of step (a), of the number of repetitions of steps (d) and (e) needed to generate the data in step (f).

10. The invention of claim 8, wherein:
the first vector length is given by $\|r - H\, x^P_{SET}\|$, where:
r is a complex N-dimensional complex vector $[r_1, \ldots, r_i, \ldots, r_N]^T$ with $r_i$ being the signal received by the $i^{th}$ receiver;
N is the number of receivers;
H is a complex [N×M] matrix containing transfer-functions $h_{im}$ (i=1,…,N; m=1,…,M), wherein $h_{im}$ is the transfer-function for transmission from the $m^{th}$ transmitter to the $i^{th}$ receiver;
M is the number of transmitters; and
$x^P_{SET}$ is the $p^{th}$ M-dimensional complex vector $[x^P_{SET,1}, \ldots, x^P_{SET,m}, \ldots, x^P_{SET,M}]^T$ of the set $X_{SET}$, wherein the complex vectors $x^P_{SET}$ in the set $X_{SET}$ contain possible combinations of values that can be assigned by the one or more transmitters to an information signal x; and
the second vector length is given by $\|v_{old} - h_m * x^P_{SET,m}\|$, where:
$v_{old}$ is one of the complex vectors in the subset; and
$h_m$ is the $m^{th}$ column of H, where m corresponds to the current transmitter.

11. The invention of claim 8, wherein the second specified number of complex vectors is less than the first specified number of complex vectors.

12. The invention of claim 7, wherein:
the subset of combinations selected in step (b) corresponds to the complex vectors having first vector lengths smaller than a first specified threshold; and
the reduced subset of combinations selected in step (d) corresponds to the complex vectors having second vector lengths smaller than a second specified threshold.

13. The invention of claim 12, wherein the method is performed with no knowledge, prior to the occurrence of step (a), of the number of repetitions of steps (d) and (e) needed to generate the data in step (f).

14. The invention of claim 12, wherein:
the first vector length is given by $\|r - H\, x^P_{SET}\|$, where:
r is a complex N-dimensional complex vector $[r_1, \ldots, r_i, \ldots, r_N]^T$ with $r_i$ being the signal received by the $i^{th}$ receiver;
N is the number of receivers;
H is a complex [N×M] matrix containing transfer-functions $h_{im}$ (i=1,…,N; m=1,…,M), wherein $h_{im}$ is the transfer-function for transmission from the $m^{th}$ transmitter to the $i^{th}$ receiver;
M is the number of transmitters; and
$x^P_{SET}$ is the $p^{th}$ M-dimensional complex vector $[x^P_{SET,1}, \ldots, x^P_{SET,m}, \ldots, x^P_{SET,M}]^T$ of the set $X_{SET}$, wherein the complex vectors $x^P_{SET}$ in the set $X_{SET}$ contain possible combinations of values that can be assigned by the one or more transmitters to an information signal x; and
the second vector length is given by $\|v_{old} - h_m * x^P_{SET,m}\|$, where:
$v_{old}$ is one of the complex vectors in the subset; and
$h_m$ is the $m^{th}$ column of H.

15. The invention of claim 12, wherein the second specified threshold is less than the first specified threshold.

16. The invention of claim 7, wherein the subset is calculated by:
(i) calculating an inner product of a complex vector representing the one or more received signals with a complex conjugated and transposed column of a matrix containing transfer functions representing transmission between the one or more transmitters and the one or more receivers;

(ii) calculating, based on a summation of the transmitted signals transmitted by all of the transmitters except for the transmitter corresponding to the complex conjugated and transposed column of the matrix, a plurality of terms corresponding to a plurality of combinations of possible data values that can be assigned to the one or more received signals;

(iii) estimating the inner product calculated in step (i) based on the calculations of steps (I) and (ii); and (iv) deriving, based on the estimated inner product of step (iii), a subset of complex vectors, each of the complex vectors in the subset representing one of the combinations of possible data values that can be assigned to the one or more received signals.

17. The invention of claim 16, wherein:

the inner product of step (i) is given by $h^*_u r$, where:

r is a complex N-dimensional vector $[r_1, \ldots, r_i, \ldots, r_N]^T$ with $r_i$ being the signal received by the $i^{th}$ receiver;

$h_u$ is the $u^{th}$ column of the matrix H;

H is a complex [N×M] matrix containing transfer-functions $h_{im}$ (i=1,...,N; m=1,...,M), wherein $h_{im}$ is the transfer-function for transmission from the $m^{th}$ transmitter to the $i^{th}$ receiver; and M is the number of transmitters;

the plurality of terms of step (ii) is given by $$Interf = \sum_{(i=1,\ldots,M \wedge i \neq u)} x_i * (h^*_u * h_i),$$

where:

$$\sum_{(i=1,\ldots,M \wedge i \neq u)} (\ldots)$$

is a summation over the index i from 1 to M with the exception of the integer u; and $h_i$ is the $i^{th}$ column of the matrix H; and the estimated inner product of step (iii) is given by $Interf + x_u * (h^*_u * h_u)$, where:

the value for $x_u$ corresponds to each of the value combinations $[x_1, \ldots, x_{u-1}, x_{u+1}, \ldots, x_M]$ and constitutes a test set comprising a plurality of complex vectors $x^P_{SET}$; and the subset of complex vectors of step (iv) is derived by $\arg_{over\ set}\min(\|r - H x^P_{SET}\|)$, where $\arg_{over\ set}\min(\|\ldots\|)$ is a function identifying the vector having the minimum length in a set of vectors.

18. The invention of claim 7, wherein the number of transmitters and the number of receivers are unequal.

19. The invention of claim 7, wherein the number of transmitters is greater than one, and steps (d) and (e) are implemented more than once.

20. An apparatus for decoding data encoded in a plurality of transmitted signals transmitted by one or more transmitters, the transmitted signals having encoded therein a plurality of symbols, the apparatus comprising:

one or more receivers, each receiver adapted to receive at least one of the transmitted signals and generate one or more received signals; and a signal processing unit adapted to process the one or more received signals to decode the data by:

(a) calculating a first vector length for each of a plurality of complex vectors corresponding to a constellation having a plurality of combinations of possible data values;

(b) selecting a subset of the combinations based on the first vector lengths calculated in step (a);

(c) calculating, for a first transmitter, a second vector length for each complex vector corresponding to a combination in the subset;

if there are one or more other transmitters, then, for each other transmitter, implementing steps (d) and (e), wherein:

step (d) comprises reducing the subset based on the second vector lengths calculated in step (c); and step (e) comprises calculating, for a current transmitter, a second vector length for each complex vector corresponding to a combination in the reduced subset; and (f) generating the data based on the combination of possible data values that corresponds to the complex vector having the smallest second vector length in the subset.

* * * * *

UNITED STATES PATENT AND TRADEMARK OFFICE
CERTIFICATE OF CORRECTION

PATENT NO. : 6,968,013 B2
DATED : November 22, 2005
INVENTOR(S) : Geert Arnout Awater et al.

It is certified that error appears in the above-identified patent and that said Letters Patent is hereby corrected as shown below:

Title page,
Item [75], Inventors, replace "Greet Arnout Awater" with -- Geert Arnout Awater --.

Column 14,
Line 57, replace "$r_j$" with -- $r_i$ --.

Column 16,
Line 54, replace "M) of * x, and" with -- M) of x, and --.

Column 17,
Line 21, replace "$z'=\text{Interf}+x_u^*(h^*_u{}^*h_u)$" with -- $z'=\text{Interf}+x_u^*(h^*_u{}^*h_u)$ --.

Signed and Sealed this

Twenty-eighth Day of February, 2006

JON W. DUDAS
*Director of the United States Patent and Trademark Office*